(12) United States Patent  
Longanbach (10) Patent No.: US 12,345,605 B2  
(45) Date of Patent: Jul. 1, 2025

(54) SYSTEM, APPARATUS, COMPUTER PROGRAM PRODUCT, AND METHOD FOR DETERMINING TRACK PITCH DISTANCE MEASUREMENT

(71) Applicant: Caterpillar Inc., Peoria, IL (US)

(72) Inventor: David M. Longanbach, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 311 days.

(21) Appl. No.: 18/116,861

(22) Filed: Mar. 3, 2023

(65) Prior Publication Data

US 2024/0295470 A1  Sep. 5, 2024

(51) Int. Cl.

| | | |
|---|---|---|
| *G01M 17/03* | (2006.01) | |
| *G06T 7/00* | (2017.01) | |
| *G06T 7/50* | (2017.01) | |
| *G06T 7/80* | (2017.01) | |
| *H04N 23/61* | (2023.01) | |

(52) U.S. Cl.
CPC ........... *G01M 17/03* (2013.01); *G06T 7/0002* (2013.01); *G06T 7/50* (2017.01); *G06T 7/80* (2017.01); *H04N 23/61* (2023.01); *G06T 2207/30204* (2013.01)

(58) Field of Classification Search
CPC . G01M 17/03; G06T 7/80; G06T 7/50; G06T 7/0002; H04N 23/61

USPC .......................................................... 348/125
See application file for complete search history.

(56) References Cited

U.S. PATENT DOCUMENTS

| | | | | |
|---|---|---|---|---|
| 5,871,391 | A   * | 2/1999  | Pryor ........................ | F02F 1/24 |
| | | | | 356/600 |
| 9,613,413 | B2    | 4/2017  | Hasselbusch et al. | |
| 9,880,075 | B2  * | 1/2018  | Finch ................. | G01N 21/8851 |
| 10,282,834 | B1  * | 5/2019  | Finch ........................ | G06T 7/50 |
| 10,933,877 | B2    | 3/2021  | Lussier et al. | |
| 11,010,889 | B2    | 5/2021  | Finch et al. | |
| 2014/0105481 | A1  * | 4/2014  | Hasselbusch ......... | G06T 7/0006 |
| | | | | 382/141 |
| 2015/0337522 | A1  * | 11/2015 | Diekevers ................. | E02F 9/26 |
| | | | | 701/33.9 |
| 2018/0065691 | A1  * | 3/2018  | Dumitru ............ | B62D 55/0847 |
| 2019/0139211 | A1  * | 5/2019  | Morawitz .............. | G01B 11/22 |
| 2021/0088416 | A1  * | 3/2021  | Grenzi ................... | B62D 55/32 |
| 2021/0173399 | A1  * | 6/2021  | Richard ................ | B60W 50/14 |
| 2021/0339758 | A1  * | 11/2021 | Laperle .................. | G06T 17/00 |
| 2022/0185399 | A1  * | 6/2022  | Grenzi ..................... | F16G 13/07 |
| 2024/0343274 | A1  * | 10/2024 | Steger ....................... | B61K 9/08 |

\* cited by examiner

*Primary Examiner* — Matthew David Kim (57) ABSTRACT

Systems, apparatuses, computer program products, and methods can determine a distance between a pair of markers removably coupled to a pair of non-adjacent joints on a track assembly of a track-type machine using imaging captured by a camera of a mobile electronic device. The determined distance between a pair of markers can be representative of a track pitch extension, which can be used to determine wear of the track assembly.

20 Claims, 5 Drawing Sheets

SYSTEM, APPARATUS, COMPUTER PROGRAM PRODUCT, AND METHOD FOR DETERMINING TRACK PITCH DISTANCE MEASUREMENT

TECHNICAL FIELD

The present disclosure relates generally to systems, apparatuses, computer program products, and methods for determining track assembly pitch extension of a track-type machine.

BACKGROUND

A track-type machine, such as a track-type tractor, has a track assembly with track links and other parts that are subject to forces as the track-type machine moves material on a worksite. Such forces can cause the track assembly to wear over time. For instance, wear may occur inside one or more joints of the track assembly, i.e., the pin and bushing of the joint, as the track goes around during operation of the track-type machine. The wear may cause the inner diameter of the bushing to expand, which, consequently, can cause the track assembly to expand at the joint. As wear continues to occur at the joint due to operation of the track-type machine, the track assembly will continue to expand to the point of where the track assembly will need to be replaced.

It may be desirable to know the degree of wear of the track assembly. In this regard, a change in track assembly extension can be indicative of internal undercarriage wear for the track assembly. An accurate determination of change in track assembly extension may be difficult to obtain manually, for instance, using a tape measurer. Moreover, manually recording the track assembly extension value can be cumbersome.

U.S. Patent Pub. No. 2014/0105481 ("the '481 patent publication") describes methods and systems for determining part wear based on a digital image of the part. The '481 patent publication describes that a user may orient a mobile device so that a wear part (e.g., a link of tracks of the track assembly) is within a field of view of a camera of the mobile device, and then may provide input to an input device of the mobile device to capture a digital image of the wear part. According to the '481 patent publication, the mobile device and/or a parts image processing system, depending upon the embodiment, may then process the digital image to determine the degree of wear of the part.

SUMMARY

One aspect of the present disclosure relates to a method comprising: removably placing a first magnetic marker on a first joint of a track assembly of a track-type machine; removably placing a second magnetic marker on a second joint of the track assembly of the track-type machine, the second joint being spaced from the first joint by at least two intervening track segments of the track assembly of the track-type machine; imaging, using a camera of a mobile electronic device, a portion of the track assembly having the first magnetic marker and the second magnetic marker; determining, using a processor of the mobile electronic device, a distance between the first and second magnetic markers, said determining the distance between the first and second magnetic markers including performing a calibration process to determine how far away the camera is from the first and second magnetic markers; and determine track assembly wear of the track assembly based on the determined distance between the first and second markers on the first and second joints, respectively.

Another aspect of the present disclosure relates to a system for determining wear of a track assembly of a track-type machine. The system can comprise: a pair of self-centering magnetic markers of known dimensions to be removably coupled to non-adjacent joints of the track assembly; and a mobile electronic device having a processor, memory operatively coupled to the processor, and a digital camera operatively coupled to the processor to perform digital imaging of a portion of the track assembly having the pair of self-centering magnetic markers removably coupled to the non-adjacent joints of the track assembly. The processor, running a mobile or web application, can be configured to: detect a center of each of the self-centering magnetic markers removably coupled to the non-adjacent joints of the track assembly based on the digital imaging of the digital camera the portion of the track assembly having the pair of self-centering magnetic markers removably coupled to the non-adjacent joints of the track assembly, determine a distance between the centers of the self-centering magnetic markers, the determining of the distance including performing a calibration process to determine how far away the digital camera is from the pair of self-centering magnetic markers, determine track assembly wear of the track assembly based on the determined distance between the centers of the markers, and output an indication of wear of the track assembly based on the determined track assembly wear.

Yet another aspect of the present disclosure relates to a non-transitory computer-readable storage medium having stored thereon instructions that, when executed by one or more processors, causes the one or more processors to perform a method. The method can comprise: capturing an image a portion of a track assembly of a track-type machine having a pair of markers removably coupled to a pair of pins of the track assembly, the pair of pins of the track assembly being spaced from each other by a plurality of intervening pins of the track assembly; determining a distance between the pair of markers removably coupled to the pair of pins; determining track assembly wear of the track assembly based on the determined distance between the pair of markers removably coupled to the pair of pins; and outputting wear information indicative of the determined wear of the track assembly.

DETAILED DESCRIPTION

The present disclosure relates generally to systems, apparatuses, computer program products, and methods for determining a track assembly pitch extension measurement of a track-type machine. According to embodiments of the present disclosure, the systems, apparatuses, computer program products, and methods can automatically determine wear of a track assembly based on the determined track assembly pitch extension.

Figure 1:
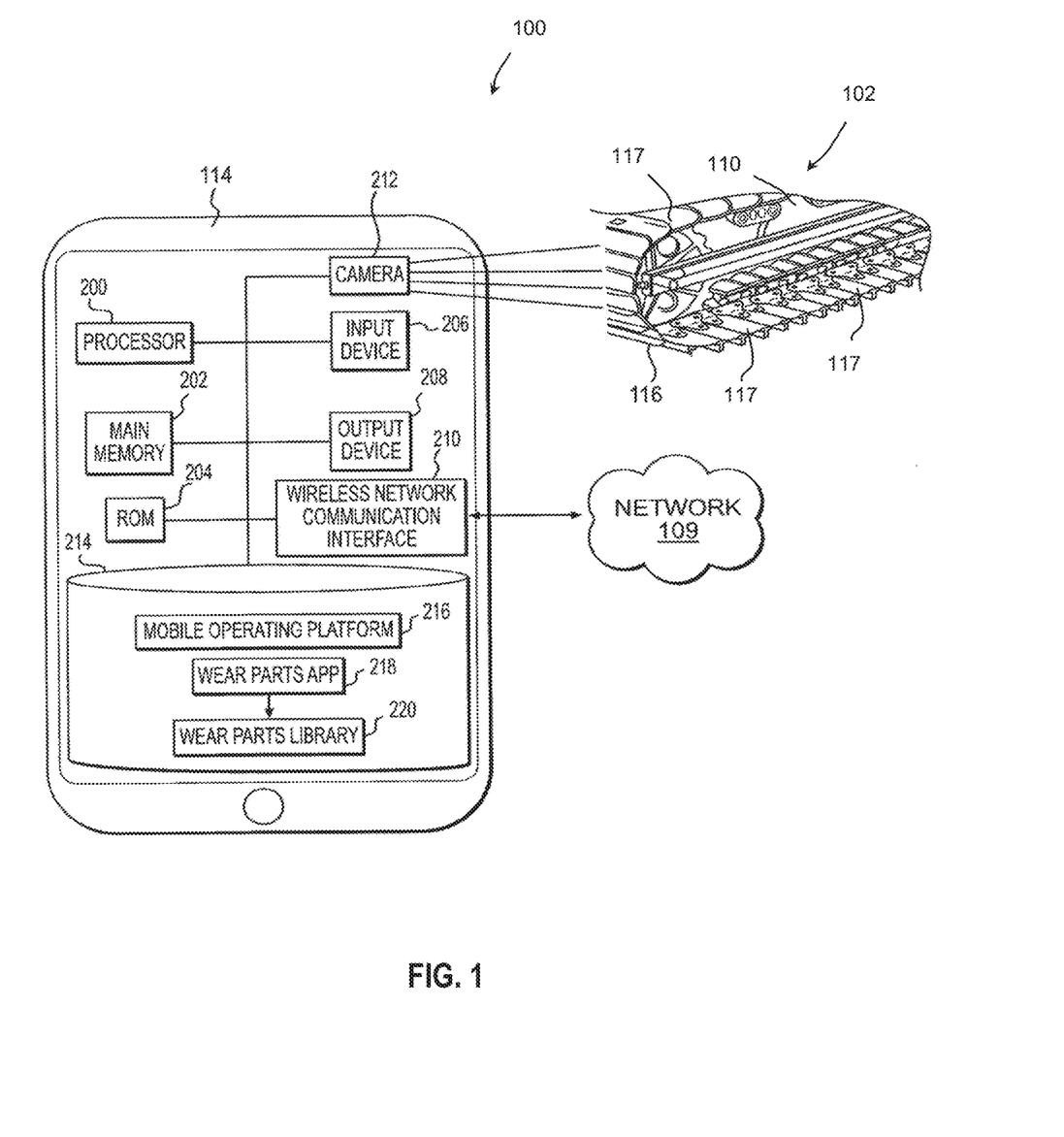
FIG. 1 is a representation of an exemplary environment for embodiments of the present disclosure.

FIG. 1, as noted above, is a representation of an exemplary environment 100 for embodiments of the present disclosure. The environment 100 may be or include a machine site 102. The machine site 102 can be a worksite, such as a construction or mine site, a repair shop, a dealership, an owner's residence, a highway or road, etc.

The environment 100 can also include a mobile electronic device 114 and a machine 110. The mobile electronic device 114 may embody any type of portable computing device equipped with a camera function. The mobile electronic device 114 may also be configured to communicate data over a network 109. For instance, the mobile electronic device 114 may be a smartphone, a cell phone, a tablet computer, a personal digital assistant (PDA), a network-enabled digital camera, or other such portable computing device. The machine 110 can be a track-type machine, such as a track-type tractor (e.g., bulldozer) or an excavator. In one or more embodiments, the machine 110 may be regarded or characterized as an off-highway machine. The mobile electronic device 114 and the machine 110 can be at the machine site 102. Further, the mobile electronic device 114 may be operated by user, such as an owner or owner representative (including contractor) of the machine 110.

A network 109 may wirelessly communicatively couple the mobile electronic device 114 to the machine 110 and/or to other systems, including, but not limited to, a parts image processing system, an application store, and/or a dealer system. Network 109 may represent any type or combination of electronic communication network(s) configured to communicate data between nodes connected to network 109. For example, network 109 may represent the Internet, an Ethernet, a local area network (LAN), a wide area network (WAN), a personal area network (PAN), cellular network, a public switched telephone network (PSTN), or any combination thereof. In one embodiment, network 109 may include a mobile network and related infrastructure operable to provide Internet connectivity to mobile electronic device 114, such as a 4th Generation (4G) or 5th Generation (5G) cellular communication network. The network 109 may be regarded as an electronic communication network.

Figure 2:
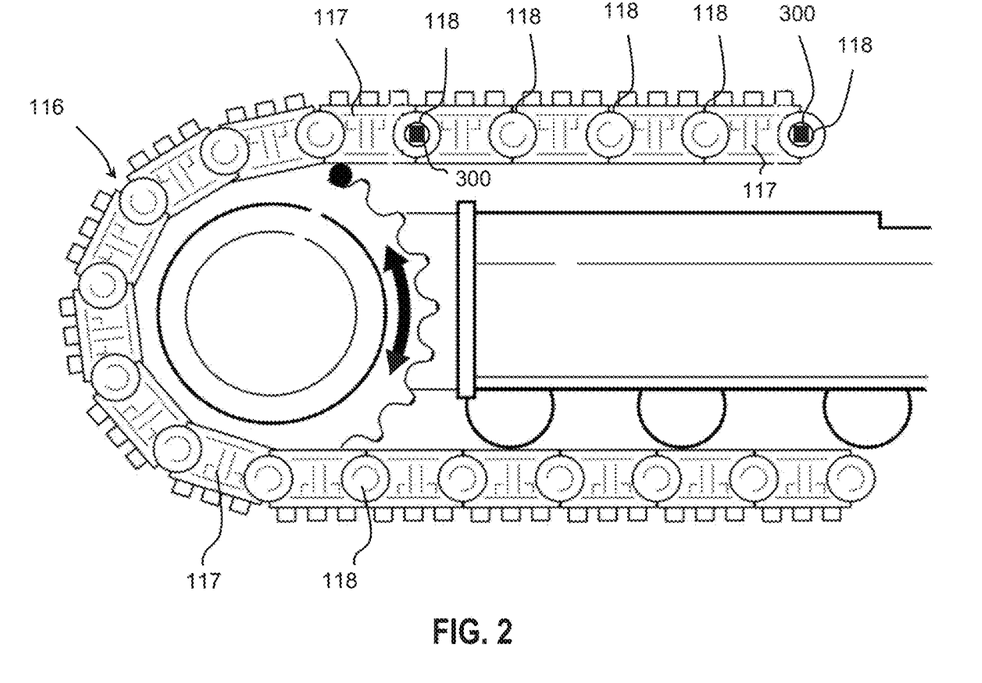
FIG. 2 shows a partial side view of a track assembly of a track-type machine with markers according to one or more embodiments of the present disclosure.
Figure 3:
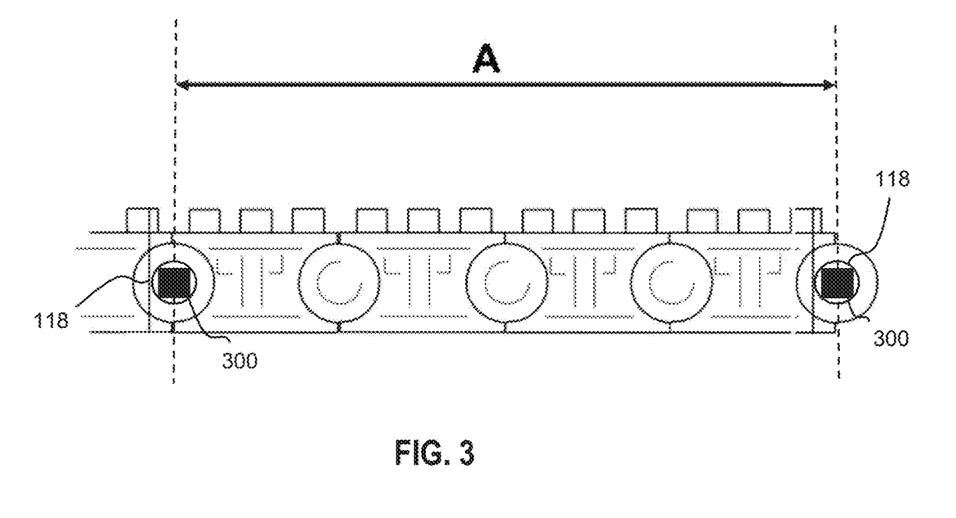
FIG. 3 is an enlarged view of a portion of FIG. 2.

As shown in FIG. 1, and now also referring to FIG. 2 and FIG. 3, the machine 110 can have relatively high-stress parts like a track assembly 116 made up of individual track assembly links or segments 117 connected by pins 118 via respective bushings. The track assembly 116 can also include other components, including one or more top rollers, shoe plates, one or more idler wheels, one or more bottom rollers, one or more gearbox sprockets, one or more track motor gearboxes, and one or more idler wheel bracket mountings.

As shown in FIG. 1, according to an exemplary embodiment of the mobile electronic device 114, the mobile electronic device 114 can contain computing components that enable it to transmit/receive, process, and store data. For example, mobile electronic device 114 may have a processor 200 (which may be representative of one or more processors), a main memory 202, a read-only memory (ROM) 204, an input device 206, an output device 208, a wireless network communication interface 210, a camera 212, and a storage device 214, among other components.

Processor 200 may embody any general-purpose or special-purpose computer microprocessor configured to execute computer program instructions, applications, or programs stored in main memory 202 and/or in storage device 214. When programmed to operate according to embodiments of the present disclosure, i.e., configured to perform various functions or operations, the processor 200 may be regarded as a special-purpose processor. Main memory 202 may include, for example, a random-access memory (RAM) or other type of dynamic or volatile storage device. Main memory 202 may store information, instructions, programs, or applications loaded from ROM 204 or storage device 214 for execution by processor 200.

ROM 204 may be any static or nonvolatile memory storage device configured to store computer program instructions, programs, or applications for loading into main memory 202 and execution by processor 200. For example, ROM 204 may be a programmable read-only memory (PROM), such as an erasable programmable read-only memory (EPROM), an electronically erasable programmable read-only memory (EEPROM), a one-time programmable read-only memory (OTP NVM), a field-programmable read-only memory (FPROM), or a Flash memory device.

Input device 206 may embody one or more mechanisms that permit the user to input information or commands to mobile electronic device 114. For example, input device 206 may include a keyboard, a touch screen, a touch pad, a mouse, a stylus, a voice-recognition device, a biometric-recognition device, an accelerometer, a microphone, or any other type of device for enabling user input to a computing device.

Output device 208 may include one or more mechanisms that output information to the user of the mobile electronic device 114. For example, the output device 208 may include a display device, a speaker, a vibrating device, a lighting device or lamp, or any other type of device for providing output to a user of a computing device.

Wireless network communication interface 210 may include any device or system enabling mobile electronic device 114 to communicate voice and/or data over the network 109. For example, wireless network communication interface 210 may include one or more radio antennas, transceivers, and/or other components for wireless communication. Such wireless networks may include, for example, a cellular network, such as a 4th Generation (4G) or 5th Generation (5G) network; a local area network (LAN), such as a Wi-Fi network (e.g., IEEE 802.11 protocol), or a WiMAX™ network (e.g., IEEE 802.16 protocol); a picocell or femtocell network (e.g., a Bluetooth™ or other unlicensed radio spectrum network); or other type of the network 109. Wireless network communication interface 210 may include any components known in the art necessary to communicate on such network(s).

Camera 212 may embody any image-detection device mounted to or otherwise associated with mobile electronic device 114 that captures an image within a view of mobile electronic device 114. For example, the camera 212 may be a visual-light-spectrum camera device mounted on mobile electronic device 114 and operable to capture and store a digital image in response to the user providing appropriate input to input device 206, such as pressing a "soft" camera button displayed on a touch screen. Camera 212 may have an embedded image sensor made up sensor pixels, such as a charge-coupled device (CCD). The sensor pixels may convert incident electromagnetic radiation focused thereon by a lens into electrical charges for storage as a digital image. In other embodiments, the camera 212 may be an infrared camera device or an X-ray camera device. Indeed, camera 212 may embody any type of device configured to capture electromagnetic radiation as a digital image. Here, the captured image can be in still form or non-still form. Thus, according to one or more embodiments of the present disclosure, the camera 212 may display a live image and the processor 200 can perform processing to determine the track assembly pitch distance, particularly extension, in real time. Alternatively, a still image can be captured and processed by the processor 200 to determine the track assembly pitch extension, for instance, in response to another user input to the input device 206.

Storage device 214 may include any type of mass data storage device on mobile device 114. For example, storage device 214 may embody a solid-state drive (SSD) or a magnetic data storage device, such as a hard drive. When the user captures a digital image with camera 212, the processor 200 may store the image in the storage device 214. Additionally, as shown in FIG. 1, in a "client-side" environment 100, storage device 214 may store a mobile operating platform 216 as well as a wear parts application 218 and an associated wear parts library 220.

Mobile operating platform 216 may embody any type of software operating environment for a mobile computing device in which one or more mobile applications executes. For example, mobile operating platform 216 may embody the Apple IOS™ operating environment, the Google Android™ operating environment, the Windows Mobile™ operating environment, or another graphical operating environment configured to execute on a mobile computing device and support execution of mobile applications.

Wear parts application 218 may embody an application configured to execute on mobile operating platform 216 to perform functions for determining the degree of wear of the track assembly 116 of the machine 110 based on one or more digital images captured with the camera 212. In one embodiment, the mobile electronic device 114 may download the wear parts application 218 (and wear parts library 220) from an application store, over the network 109. Such download may or may not require prior user registration.

Wear parts library 220 may contain wear information for the track assembly 116 corresponding to the machine 110. Optionally, the wear parts library 220 may contain wear information for track assemblies of multiple different machines, including the machine 110. Wear information can include track assembly pitch distance measurements (in mm or inches) corresponding to different degrees of wear, for instance, from 0% wear to 120% wear. Such track assembly pitch distance measurements (in mm or inches) corresponding to different degrees of wear can be stored in the wear parts library 220 in a wear table, though embodiments of the present disclosure are not limited to a wear table and may be in the form of an equation, formula, mathematical model, or other means for computing a degree of wear as a function of a measured dimension of a track assembly pitch distance measurement, for instance. Here, track assembly pitch distance may be regarded as track assembly pitch extension. In one embodiment, each wear table may define a degree of wear of the track assembly 116 as a function of a measured dimension between a predetermined set number (e.g., four) of track assembly links 117. Optionally, the wear parts library 220 can indicate a predetermined wear threshold, i.e., percentage of wear, for replacement of the track assembly 116 or portion thereof.

Referring again to FIG. 2 and FIG. 3, a pair of markers 300 can be provided at the machine site 102. As shown in FIG. 2 and FIG. 3, the markers 300 can be affixed to the track assembly 116 of the machine 110. In particular, the markers 300 can be affixed to an outer edge or surface of a pair of non-adjacent joints, for instance, to an outer edge or surface of a corresponding pair of pins 118 for the non-adjacent joints. In this regard, the markers 300 may be magnetic and, as such, can be removably affixed or coupled to the pair of pins 118, which can be made of metal. Hence, the markers 300 may be regarded as magnetic markers 300. The markers 300 may be additionally or alternatively fixed to the outer edge or surface of a pair of non-adjacent joints by press-fit, an adhesive, etc.

Notably, the pins 118 having the markers 300 may not be adjacent to each other. For instance, as shown in FIG. 2 and FIG. 3, the three pins 118 can separate the pair of pins 118 having the markers 300. Thus, the markers 300 can be associated with four track assembly links 117 and hence identify a combined length of the four track assembly links 117 between the pair of pins 118 with the markers 300. Such combined length may be representative of an average track assembly pitch for each individual track assembly link 117, for instance, over the entire track assembly 116. Also shown in FIG. 2 and FIG. 3, the markers 300 can be on a straight segment of the track assembly 116, in this case on the top or upper section of the track assembly 116, in contrast to a curved or bent section of the track assembly 116, such as the front or rear of the track assembly 116. As an example, the measured distance A between the two markers 300 (and thus the corresponding pins 118) compared to a 0% wear state can be 1.05 inches or less greater than the 0% wear state, depending upon the size of the track assembly 116. In this regard, the 100% wear state can be at or about 0.5 inches to at or about 1.05 inches greater than the length for the 0% wear state, again, depending upon the size of the track assembly 116.

Figure 4:
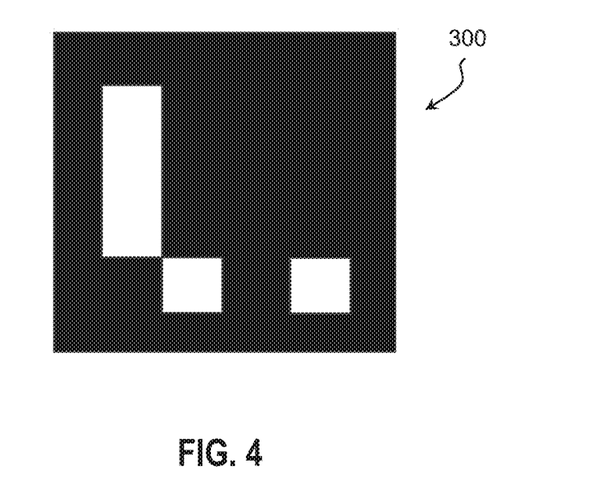
FIG. 4 shows an exemplary marker according to one or more embodiments of the present disclosure.
Figure 5:
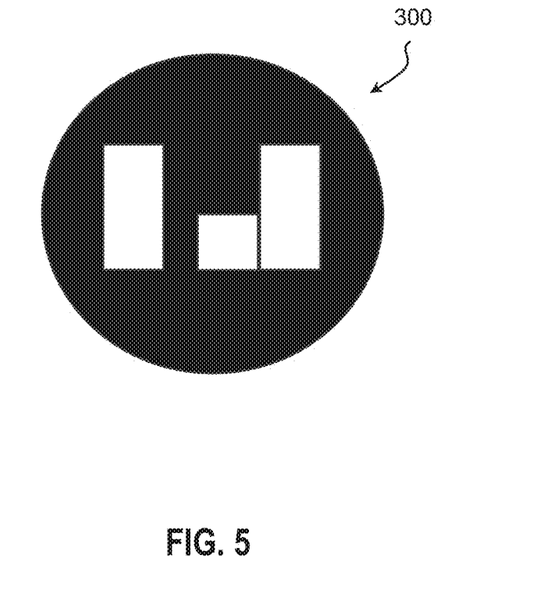
FIG. 5 shows an exemplary marker according to one or more embodiments of the present disclosure.

For placement, the markers 300 can be centered on their respective pins 118 of the pair. The centering can be accomplished based on the geometry of the markers 300 relative to the geometry of the pins 118. For instance, the geometry of the markers 300 can be symmetrical in a face view, such as square or circular as shown in FIG. 4 and FIG. 5, respectively, whereas the geometry of the pins 118 can be circular in the face view (i.e., side view of the track assembly 116). Here, the marker 300 can be sized based on the size of the pin 118 such that the edge(s) of the marker 300 does not extend past the edge of the pin 118, i.e., outer diameter or circumference of the pin 118, such as shown in FIG. 2 and FIG. 3. Such placement can be indicative of the marker 300 being centered on the pin 118. In this regard, the markers 300 may be regarded as self-centering markers 300. Thus, according to embodiments of the present disclosure, the markers 300 used for a particular machine 110 can be sized to fit within the size of the pins 118 (i.e., outer diameter or circumference) for the particular machine 110. Optionally, one size of marker 300 (i.e., cross-section, diameter, etc.) may be small enough to self-center on multiple sizes of pins 118.

Regarding the markers 300, the markers 300 may be configured to be relatively easily picked up by the camera 212 of the mobile electronic device 114. As an example, the markers 300 may have a unique identification in the form of their shape and/or indicia. For instance, in one example, the markers 300 may be square to contrast with the circular geometry of the pins 118. Additionally or alternatively, the surface of the marker 300 may include indicia, for instance, encoded with information to assist with marker identification by the mobile electronic device 114. According to one or more embodiments, the indicia may represent bits or a simple quick response (QR) code. FIG. 4 and FIG. 5 show exemplary indicia on the markers 300.

In operation, the user (e.g., of the mobile electronic device 114) can visit the machine 110 to perform an inspection of the machine 110, particularly the track assembly 116 thereof, for wear. The user can place a pair of markers 300 on respective pairs of pins 118 of the track assembly 116. According to one or more embodiments, the markers 300 can be placed on non-adjacent pins 118, such as shown in FIG. 2 and FIG. 3. Further, in that the markers 300 can be magnetic, the markers 300 can be regarded as being removably coupled to the pins 118. Based on the geometric configuration of each marker 300 relative to the geometric configuration of the end surface of the corresponding pin 118, the marker 300 can be centered on the pin 118, for instance, so a portion or portions of the perimeter of the marker 300 extend to but not past a perimeter of the pin 118 geometry. Such placement may be regarded as self-centering of the markers 300 (on the pins 118).

Using the camera 212 of the mobile electronic device 114, the user can "image" at the same time both markers 300 on the track assembly 116. Here, imaging can include taking a still photograph of both of the markers 300 on the track assembly 116 and/or merely capturing an image of the track assembly 116 with both markers 300 such that the image is displayed in real time on the output device 208 of the mobile electronic device 114. Thus, according to one or more embodiments, the imaging can entail the user providing an input to the input device 206 to capture the image. Additionally or alternatively, the user may merely need to turn on the camera 212 and hold the camera 212 still to capture a real-time image of the track assembly 116 with both markers 300.

Figure 6:
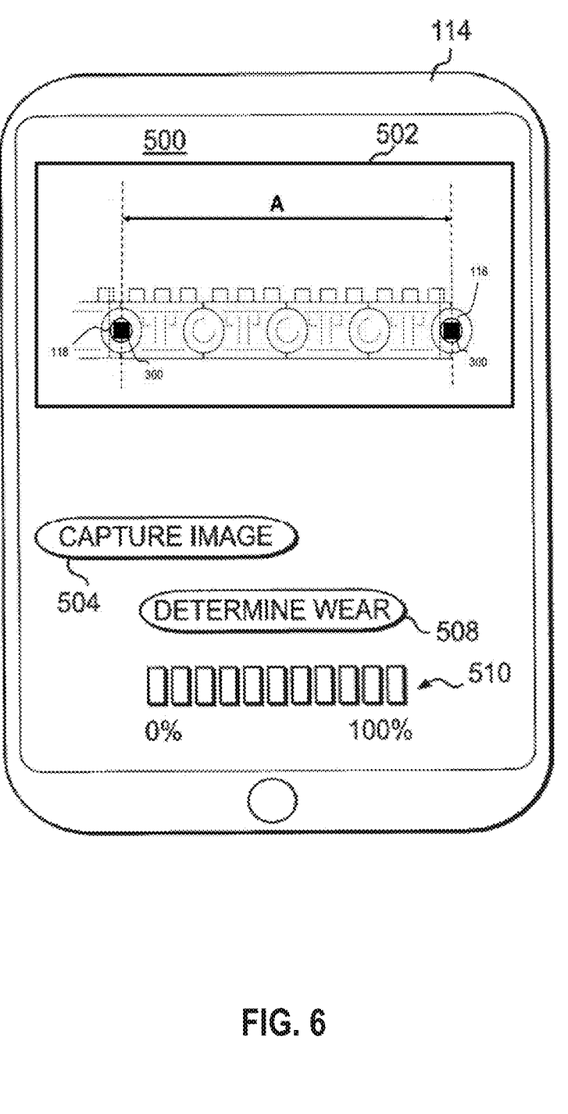
FIG. 6 is a representation of an exemplary graphical user interface (GUI) display of a mobile device consistent with one or more embodiments of the disclosed embodiments.

FIG. 6 shows an example of a user interface 500 of the mobile electronic device 114 according to one or more embodiments of the present disclosure. The user interface 500, which may be regarded in-whole or in-part as a graphical user interface (GUI), may be representative of some or all of the input device 206 of the mobile electronic device 114 and/or some or all of the output device 208 of the mobile electronic device 114. The image 502 shown in FIG. 6, which can be output on a display of the mobile electronic device 114 (which may be on or part of the user interface 500), can be representative of a still image of the track assembly 116 with both markers 300, for instance, captured in response to the user providing an input to the user interface 500, for instance, in the form of an input selection "Capture Image" 504, or real-time imaging by the user merely turning on the camera 212 and holding the camera 212 steady to capture the real-time image of the track assembly 116 with both markers 300. Optionally, the mobile electronic device 114 can identify whether one or both of the markers 300 are centered on their respective pins 118. If not, the mobile electronic device 114 can output an indication to the user that one or both of the markers 300 (and the particular marker 300 in the case of only one marker 300) is not centered. According to one or more embodiments, an image (e.g., a red 'X') may be overlaid on the marker or markers 300 that are not centered on their pins 118.

Upon capturing the still image using the input selection 504 or upon turning on the camera 212 and holding the camera 212 steady to capture the real-time image of the track assembly 116 with both markers 300, the user can access input selection 508 to determine an amount of wear of the track assembly 116. Optionally, in the case of capturing the real-time image of the track assembly 116 with both markers 300, the user may use the input selection 508 prior to or at the time of holding the camera 212 still with the real-time image of the track assembly 116 with both markers 300 and the mobile electronic device 114, particularly the processor 200 thereof in cooperation with the camera 212, can automatically detect the markers 300.

In any case, whether the still image or the real-time image of the track assembly 116 with both markers 300, the mobile electronic device 114 particularly the processor 200 thereof in cooperation with the camera 212, can detect the markers 300 and identify a center of each of the markers 300. Such identification may be performed by or using computer vision processing performed by the mobile electronic device 114. For instance, the processor 200 can know the geometry of the markers 300, for instance, as stored in the main memory 202 and/or the storage device 214, and thus identify the center of each marker 300.

The processor 200 may then determine or calculate a distance between the centers of the markers 300. The distance determination can involve a calibration process whereby the processor 200 knows the dimensions of the markers 300 (e.g., one inch in diameter in the case of circular markers 300 or one inch on each side in the case of square markers 300) and determines how far away the camera 212 is from the markers 300 due to the known dimensions of the markers 300. Knowing the distance of the camera 212 away from the markers 300 and the centers of the markers 300, the processor 200 can then determine the distance A between the centers of the two markers 300. Such distance calculation may be responsive to input to the input selection 508 'Determine Wear.'

Once the processor 200 determines the distance A between the two markers 300, the processor 200 can compare the determined distance to a predetermined distance, for instance, a 0% wear distance between the same amount of track assembly links 117. As noted above, the track assembly distances for various wear amounts can be stored in the storage device 214, for instance, in a wear table. In one or more embodiments, the comparison can indicate that the determined distance A is greater than the 0% wear distance. The amount of the difference, i.e., how much greater the determined distance A is compared to the 0% wear distance can be indicative of the amount of wear of the track assembly 116. Alternatively, the processor 200 can compare the distance A to representative values stored in the storage 214 and that corresponding to previously measured amounts (e.g., %) of wear for the same or similar size track assembly 116.

Once the amount of wear of the track assembly 116 is determined, whether relative to a 0% wear amount or another percentage of wear amount stored in the storage device 214, the processor 200 can output the amount of wear on the output device 208, for instance, on a wear indicator 510 of the user interface 500, such as shown in FIG. 6. Additionally or alternatively, based on the amount of wear compared to a predetermined threshold amount (e.g., 75% wear, 90% wear, or 100% wear), the processor 200 can cause the output of a warning or recommendation on the output device 208 recommending that the track assembly 116 or portion thereof should be replaced. The amount of wear may be stored in memory of the mobile electronic device 114, such as the storage device 214, and/or output to offboard the mobile electronic device via the network 109. Once the amount of wear is determined, the markers 300 can be removed from the machine 110.

INDUSTRIAL APPLICABILITY

Reference will now be made in detail to exemplary embodiments, examples of which are illustrated in the accompanying figures. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of systems and methods consistent with aspects of the disclosure as recited in the appended claims.

As noted above, the present disclosure relates generally to systems, apparatuses, computer program products, and methods for determining a track assembly pitch extension measurement of a track-type machine. According to embodiments of the present disclosure, the systems, apparatuses, computer program products, and methods can automatically determine wear of the track assembly based on the determined track assembly pitch extension. Here, the determined track assembly pitch distance, which can be representative of track assembly pitch extension, can be compared or relative to an initial track assembly pitch extension, for instance, a factory specification value of the distance when the machine leaves the factory.

Generally speaking, embodiments of the present disclosure can enable a user to relatively easily determine the degree of wear of a track assembly of a machine, simply by capturing a digital image of the track assembly with removable two markers thereof using a mobile electronic device. Consistent with the disclosed embodiments, the user may orient a mobile electronic device having a camera, such as mobile electronic device 114 having camera 212, so that a portion of the track assembly 116 having a pair of spaced markers, such markers 300, removably fixed at specific portions of the track assembly 116, is within a field of view of the camera 212, to image the portion of the track assembly 116 having the pair of spaced markers 300. The mobile electronic device 114 may then process the digital imaging to determine the degree of wear of the track assembly 116.

As an example, according to one or more embodiments of the present disclosure, track assembly pitch distance can be measured using a camera of a mobile electronic device, such as mobile electronic device 114. Two self-centering magnetic markers of known dimensions, such as markers 300, can be removably attached at the end of the track pins 118 on the opposite ends of a track assembly section comprised of a plurality of successive track assembly links 117. A mobile or a web application running on the mobile electronic device 114 can use the camera 212 to detect the two markers in two-dimensional space and transform an image into an account for any distortion. Further, the camera 212 can calibrate the distance in the image, knowing the dimensions of each marker 300, and calculate the distance between the two markers 300, particularly the distance from the centers of the two markers 300. The calculated distance measurement can then be automatically captured or recorded by the mobile or web application. Further, the distance automatically captured or recorded can be compared to one or more predetermined distance values to determine wear of the track assembly 116.

FIG. 5 is a flow chart of a method 700 according to embodiments of the disclosed subject matter. At least some of the method 700 can be performed via a non-transitory computer-readable storage medium (or media) having stored thereon instructions that, when executed by one or more processors, such as processor(s) 200, causes the one or more processors 200 to perform at least some of the method 700. According to one or more embodiments, the method 700 may be referred to or characterized as a method for determine a track assembly pitch distance or extension measurement and/or a method to determine wear of a track assembly of a machine.

Figure 7:
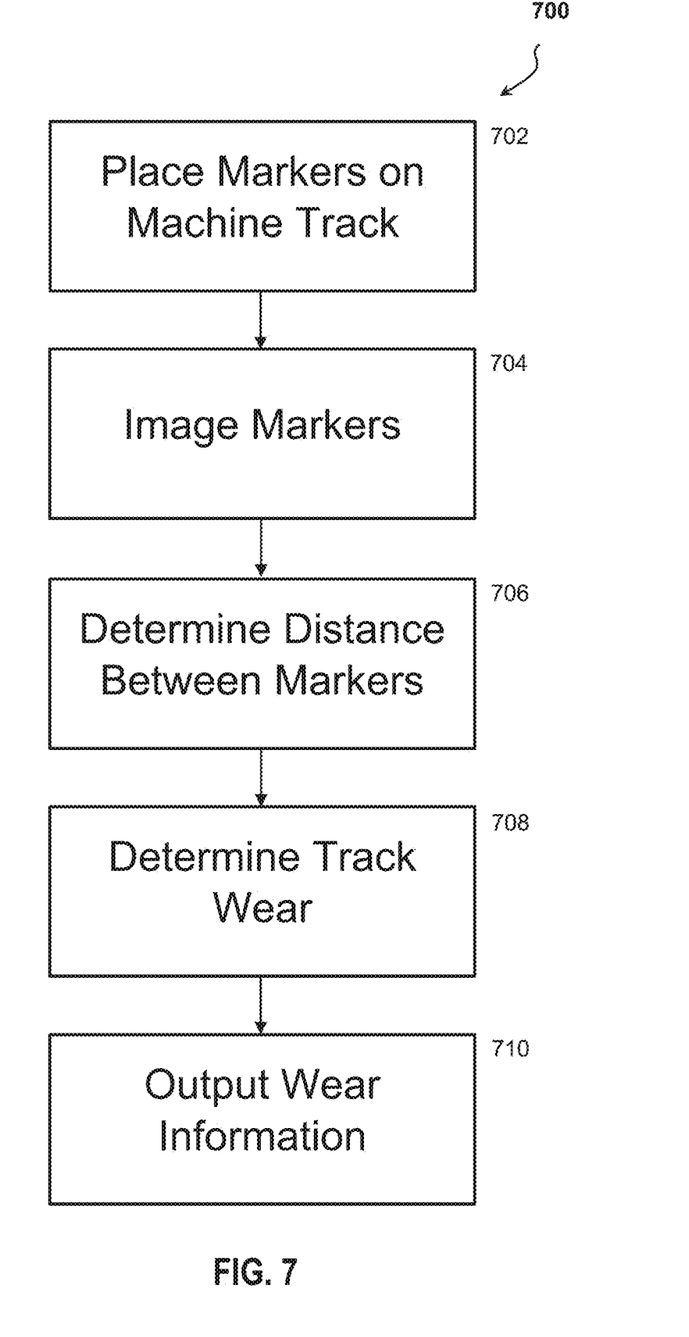
FIG. 7 is a flow chart of a method according to one or more embodiments of the present disclosure.

At 702 of the method 700, a pair of markers, such as markers 300, can be placed on a pair of joints, for instance, on a pair of pins 118 of the track assembly 116. As noted above, the markers 300 may be held to the pins 118 via magnetic force, though embodiments of the present disclosure are not so limited to holding the markers 300 to the joints via magnetic force. Further, the markers 300 may be placed on non-adjacent joints, for instance, two joints apart, four pins 118 apart (i.e., three intervening pins 118), or greater distances.

At 704 the camera 112 of the mobile electronic device 114 can image the portion of the track assembly 116 with the markers 300. Such imaging can involve capturing a still image of the portion of the track assembly 116 with the markers 300 or real-time imaging of the portion of the track assembly 116 with the markers 300.

At 706 of the method 700, the processor 200 of the mobile electronic device 114 can determine a distance between the two markers 300. Such determining may first involve a calibration to determine a distance of the camera 212 away from the markers 300. The calibration process can be based on a known dimension (e.g., diameter) of the markers 300.

At 708 of the method 700, the processor 200 can determine an amount of wear of the track assembly 116 using the determined distance from 706. The determination of the amount of wear can be based on a comparison of the determined distance to one or more predetermined values of wear of the track assembly 116, such as a 0% amount of wear of the track assembly.

At 710, wear information can be output. Such wear information can be output to the storage device 214 of the mobile electronic device 114, the output device 208 (e.g., the user interface 500) of the mobile electronic device, and/or offboard the mobile electronic device 114 via the network 109. Optionally, the distance between the two markers 300 can be output. After obtaining the wear information, the markers 300 can be removed from the machine 110.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/ software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosed subject matter can also be as set forth according to the following parentheticals.

(1) A system for determining wear of a track assembly of a track-type machine, comprising: a pair of self-centering magnetic markers of known dimensions to be removably coupled to non-adjacent joints joints of the track assembly; and a mobile electronic device having a processor, memory operatively coupled to the processor, and a digital camera operatively coupled to the processor to perform digital imaging of a portion of the track assembly having the pair of self-centering magnetic markers removably coupled to the non-adjacent joints of the track assembly, wherein the processor, running a mobile or web application, is configured to: detect a center of each of the self-centering magnetic markers removably coupled to the non-adjacent joints of the track assembly based on the digital imaging of the digital camera the portion of the track assembly having the pair of self-centering magnetic markers removably coupled to the non-adjacent joints of the track assembly, determine a distance between the centers of the self-centering magnetic markers, the determining of the distance including performing a calibration process to determine how far away the digital camera is from the pair of self-centering magnetic markers, determine track assembly wear of the track assembly based on the determined distance between the centers of the markers, and output an indication of wear of the track assembly based on the determined track assembly fwear.

(2) The system according to (1), wherein the self-centering magnetic markers are circular or square.

(3) The system according to (1) or (2), wherein the self-centering magnetic markers include embedded information on a face thereof.

(4) The system according to any one of (1) to (3), wherein the known dimensions of the self-centering magnetic markers are such that no portion of the perimeter extends past a diameter of the corresponding joint when the self-centering magnetic marker is removably coupled to the joint.

(5) The system according to any one of (1) to (4), wherein the processor is configured to automatically store the determined distance in the memory of the mobile electronic device.

(6) The system according to any one of (1) to (5), wherein the processor is configured to determine whether the self-centering magnetic markers are centered on their respective joints prior to detecting the center of each of the self-centering magnetic markers removably coupled to the non-adjacent joints of the track assembly.

(7) The system according to any one of (1) to (6), wherein the digital imaging of the digital camera is performed responsive to an input selection to a graphical user interface (GUI) on the mobile electronic device from an operator of the mobile electronic device.

(8) The system according to any one of (1) to (7), wherein the digital imaging of the digital camera is performed automatically when the camera is pointed and held steady at the portion of the track assembly having the pair of self-centering magnetic markers, and wherein the processor automatically determines the distance between the centers of the self-centering magnetic markers with the camera pointed and held steady at the portion of the track assembly having the pair of self-centering magnetic markers, and automatically determines the track assembly wear of the track assembly without a user providing input selection to the mobile electronic device once the camera is pointed and held steady at the portion of the track assembly having the pair of self-centering magnetic markers.

(9) The system according to any one of (1) to (8), wherein the processor automatically stores the determined distance and the determined track assembly wear in the memory without the user providing input selection to the mobile electronic device once the camera is pointed and held steady at the portion of the track assembly having the pair of self-centering magnetic markers.

(10) A method comprising: removably placing a first magnetic marker on a first joint of a track assembly of a track-type machine; removably placing a second magnetic marker on a second joint of the track assembly of the track-type machine, the second joint being spaced from the first joint by at least two intervening track segments of the track assembly of the track-type machine; imaging, using a camera of a mobile electronic device, a portion of the track assembly having the first magnetic marker and the second magnetic marker; determining, using a processor of the mobile electronic device, a distance between the first and second magnetic markers, said determining the distance between the first and second magnetic markers including performing a calibration process to determine how far away the camera is from the first and second magnetic markers; and determine track assembly wear of the track assembly based on the determined distance between the first and second markers on the first and second joints, respectively.

(11) The method according to (10), further comprising outputting, on or from an output device of the mobile electronic device, an indication of track assembly wear of the track assembly based on the determined track assembly wear.

(12) The method according to (10) or (11), wherein said determining the distance between the first and second magnetic markers includes determining a center of each of the magnetic markers.

(13) The method according to any one of (10) to (12), wherein said determining the distance between the first and second magnetic markers includes comparing the determined distance to one or more predetermined distances for a same separation as the separation between the first and second joints.

(14) The method according to any one of (10) to (13), wherein the comparison indicates that the determined distance is from zero inches to 1.05 inches greater than the one or more predetermined distances for the same separation.

(15) A non-transitory computer-readable storage medium having stored thereon instructions that, when executed by one or more processors, causes the one or more processors to perform a method comprising: capturing an image a portion of a track assembly of a track-type machine having a pair of markers removably coupled to a pair of pins of the track assembly, the pair of pins of the track assembly being spaced from each other by a plurality of intervening pins of the track assembly; determining a distance between the pair of magnetic markers removably coupled to the pair of pins; determining track assembly wear of the track assembly based on the determined distance between the pair of markers removably coupled to the pair of pins; and outputting wear information indicative of the determined wear of the track assembly.

(16) The non-transitory computer-readable storage medium according to (15), wherein said determining the distance between the pair of magnetic markers removably coupled to the pair of pins includes detecting a center of each of the markers removably coupled to the pair of pins.

(17) The non-transitory computer-readable storage medium according to (15) or (16), wherein said determining the distance between pair of markers includes comparing the determined distance to one or more predetermined distances for a same separation as the separation between the pair of pins.

(18) The non-transitory computer-readable storage medium according to any one of (15) to (17), wherein the comparison indicates that the determined distance is from zero inches to 1.05 inches greater than the one or more predetermined distances for the same separation.

(19) The non-transitory computer-readable storage medium according to any one of (15) to (18), wherein the method further comprises storing in memory of a mobile electronic device the determined distance between the pair of magnetic markers removably coupled to the pair of pins.

(20) The non-transitory computer-readable storage medium according to any one of (15) to (19), wherein the method further comprises determining whether each of the markers of the pair of markers is centered on their respective pins prior to determining the distance between the pair of markers removably coupled to the pair of pins.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A system for determining wear of a track assembly of a track-type machine, comprising:
   a pair of self-centering magnetic markers of known dimensions to be removably coupled to non-adjacent joints of the track assembly; and
   a mobile electronic device having a processor, memory operatively coupled to the processor, and a digital camera operatively coupled to the processor to perform digital imaging of a portion of the track assembly having the pair of self-centering magnetic markers removably coupled to the non-adjacent joints of the track assembly, wherein the processor, running a mobile or web application, is configured to:
   detect a center of each of the self-centering magnetic markers removably coupled to the non-adjacent joints of the track assembly based on the digital imaging of the digital camera the portion of the track assembly having the pair of self-centering magnetic markers removably coupled to the non-adjacent joints of the track assembly,
   determine a distance between the centers of the self-centering magnetic markers, the determining of the distance including performing a calibration process to determine how far away the digital camera is from the pair of self-centering magnetic markers,
   determine track assembly wear of the track assembly based on the determined distance between the centers of the markers, and
   output an indication of wear of the track assembly based on the determined track assembly wear.

2. The system according to claim 1, wherein the self-centering magnetic markers are circular or square.

3. The system according to claim 1, wherein the self-centering magnetic markers include embedded information on a face thereof.

4. The system according to claim 1, wherein the known dimensions of the self-centering magnetic markers are such that no portion of the perimeter extends past a diameter of the corresponding joint when the self-centering magnetic marker is removably coupled to the joint.

5. The system according to claim 1, wherein the processor is configured to automatically store the determined distance in the memory of the mobile electronic device.

6. The system according to claim 1, wherein the processor is configured to determine whether the self-centering magnetic markers are centered on their respective joints prior to detecting the center of each of the self-centering magnetic markers removably coupled to the non-adjacent joints of the track assembly.

7. The system according to claim 1, wherein the digital imaging of the digital camera is performed responsive to an input selection to a graphical user interface (GUI) on the mobile electronic device from an operator of the mobile electronic device.

8. The system according to claim 1,
   wherein the digital imaging of the digital camera is performed automatically when the camera is pointed and held steady at the portion of the track assembly having the pair of self-centering magnetic markers, and
   wherein the processor automatically determines the distance between the centers of the self-centering magnetic markers with the camera pointed and held steady at the portion of the track assembly having the pair of self-centering magnetic markers, and automatically determines the track assembly wear of the track assembly without a user providing input selection to the mobile electronic device once the camera is pointed and held steady at the portion of the track assembly having the pair of self-centering magnetic markers.

9. The system according to claim 8, wherein the processor automatically stores the determined distance and the determined track assembly wear in the memory without the user providing input selection to the mobile electronic device once the camera is pointed and held steady at the portion of the track assembly having the pair of self-centering magnetic markers.

10. A method comprising:
    removably placing a first magnetic marker on a first joint of a track assembly of a track-type machine;
    removably placing a second magnetic marker on a second joint of the track assembly of the track-type machine, the second joint being spaced from the first joint by at least two intervening track segments of the track assembly of the track-type machine;
    imaging, using a camera of a mobile electronic device, a portion of the track assembly having the first magnetic marker and the second magnetic marker;
    determining, using a processor of the mobile electronic device, a distance between the first and second magnetic markers, said determining the distance between the first and second magnetic markers including performing a calibration process to determine how far away the camera is from the first and second magnetic markers; and
    determine track assembly wear of the track assembly based on the determined distance between the first and second markers on the first and second joints, respectively.

11. The method according to claim 10, further comprising outputting, on or from an output device of the mobile electronic device, an indication of track assembly wear of the track assembly based on the determined track assembly wear.

12. The method according to claim 10, wherein said determining the distance between the first and second magnetic markers includes determining a center of each of the magnetic markers.

13. The method according to claim 10, wherein said determining the distance between the first and second magnetic markers includes comparing the determined distance to one or more predetermined distances for a same separation as the separation between the first and second joints.

14. The method according to claim 10, wherein the comparison indicates that the determined distance is from zero inches to 1.05 inches greater than the one or more predetermined distances for the same separation.

15. A non-transitory computer-readable storage medium having stored thereon instructions that, when executed by one or more processors, causes the one or more processors to perform a method comprising:

capturing an image a portion of a track assembly of a track-type machine having a pair of markers removably coupled to a pair of pins of the track assembly, the pair of pins of the track assembly being spaced from each other by a plurality of intervening pins of the track assembly;

determining a distance between the pair of markers removably coupled to the pair of pins;

determining track assembly wear of the track assembly based on the determined distance between the pair of markers removably coupled to the pair of pins; and     outputting wear information indicative of the determined wear of the track assembly.

16. The non-transitory computer-readable storage medium according to claim 15, wherein said determining the distance between the pair of markers removably coupled to the pair of pins includes detecting a center of each of the markers removably coupled to the pair of pins.

17. The non-transitory computer-readable storage medium according to claim 15, wherein said determining the distance between pair of markers includes comparing the determined distance to one or more predetermined distances for a same separation as the separation between the pair of pins.

18. The non-transitory computer-readable storage medium according to claim 15, wherein the comparison indicates that the determined distance is from zero inches to 1.05 inches greater than the one or more predetermined distances for the same separation.

19. The non-transitory computer-readable storage medium according to claim 15, wherein the method further comprises storing in memory of a mobile electronic device the determined distance between the pair of markers removably coupled to the pair of pins.

20. The non-transitory computer-readable storage medium according to claim 15, wherein the method further comprises determining whether each of the markers of the pair of markers is centered on their respective pins prior to determining the distance between the pair of markers removably coupled to the pair of pins.

\* \* \* \* \*